United States Patent [19]

Tadokoro et al.

[11] 4,315,489

[45] Feb. 16, 1982

[54] ROTARY PISTON ENGINE HAVING SUPERCHARGING MEANS

[75] Inventors: Tomoo Tadokoro; Haruo Okimoto; Yasuo Honda; Hiroshi Nomura; Masato Yoshimura, all of Hiroshima, Japan

[73] Assignee: Toyo Kogyo Co., Ltd., Hiroshima, Japan

[21] Appl. No.: 138,892

[22] Filed: Apr. 10, 1980

[30] Foreign Application Priority Data

Apr. 12, 1979 [JP] Japan .................................. 54-45087

[51] Int. Cl.³ ........................ F02B 53/06; F02B 53/08
[52] U.S. Cl. .................................... 123/213; 123/216
[58] Field of Search ............... 123/203, 213, 216, 219, 123/242

[56] References Cited

U.S. PATENT DOCUMENTS 3,977,368  8/1976  Yamaguchi et al. ............ 123/216 X

FOREIGN PATENT DOCUMENTS

| | | | |
|---|---|---|---|
| 1576194 | 5/1970 | Fed. Rep. of Germany ...... | 123/216 |
| 42-17324 | 2/1967 | Japan .................................. | 123/216 |
| 44-49491 | 10/1969 | Japan .................................. | 123/213 |
| 47-37721 | 9/1972 | Japan .................................. | 123/213 |
| 49-38212 | 10/1974 | Japan .................................. | 123/213 |
| 52-23621 | 5/1977 | Japan .................................. | 123/213 |

Primary Examiner—Michael Koczo, Jr.
Attorney, Agent, or Firm—Fleit & Jacobson

[57] ABSTRACT

Rotary piston engine having a main intake port in one side housing of the casing. The side housing is further formed with a supercharging air port which is connected with a supercharging passage leading from an air pump. The supercharging air port is so formed that it is opened substantially simultaneously with and closed later than the main intake port. A timing valve is provided in the supercharging passage to open the passage cyclically so that the supercharging is performed at the end period of the intake stroke. A centrifugal device controls the valve timing so that the valve timing is advanced under an increased engine speed.

8 Claims, 5 Drawing Figures

ROTARY PISTON ENGINE HAVING SUPERCHARGING MEANS

The present invention relates to rotary piston engines and more particularly to intake means for rotary piston engines. More specifically, the present invention pertains to intake means for rotary piston engines having supercharging means.

In general, in the field of internal combustion engines, it has been known to provide the intake system with a supercharger which functions to force the intake gas into the combustion or working chamber. In this type of intake system, however, problems have been encountered in that the supercharger is located in the intake passage so that the intake gas is totally passed through the supercharger and therefore the flow resistance of the intake passage is substantially increased resulting in a decrease in the engine output. Further, the intake gas is subjected to an adiabatic compression which causes an increase in the temperature of the gas, so that the density of the intake gas is correspondingly decreased and the charge of intake gas cannot be adequately increased. Thus, in conventional engines, in order to avoid the above problems, the supercharger must be of a substantial capacity.

In the field of rotary piston engines, it has already been proposed to provide an auxiliary or supercharging passage in addition to a main intake passage so that the flow of intake gas is not disturbed by the supercharger. For example, Japanese utility model publication No. 52-23621 discloses a rotary piston engine having an air pump for feeding a secondary air to the exhaust system to oxydize the unburnt constituents in the exhaust gas. The air pump is also connected through a control valve with a supercharging passage which opens at the intake port formed in the rotor housing. The air from the pump is thus forced into the working chamber when the control valve is opened.

This type of intake system is not however effective to provide an adequate supercharging function because in the overlapping period wherein an apex portion of the rotor is passing on the intake port there will be a substantial amount of blow back from the leading working chamber to the trailing work chamber. In order to solve the problem, the intake port may be displaced toward the trailing side. However, this solution is not preferable because such displacement of the intake port causes an increase in the overlap period resulting in a loss of combustion stability under a light load engine operation. Further, as the result of such displacement of the intake port toward the trailing side, the intake port is closed at an early stage so that total charge of intake gas is decreased.

In Japanese patent publication No. 47-37721, there is disclosed a rotary piston engine which is provided, in addition to a main intake passage, with an auxiliary intake passage having a supercharger and opening to the working chamber through an auxiliary intake port. Japanese patent publication No. 49-38212 also discloses a rotary piston engine having a supercharging auxiliary passage in addition to a main intake passage. In this type of engines, however, there are still several problems to be solved. For example, if the supply of intake gas is made through the supercharging passage when the pressure in the intake working chamber is below the atmospheric pressure and therefore the induction of gas through the main intake passage is still possible, the supercharging gas functions to disturb the intake flow through the main intake passage and causes a blow back of intake air to the main intake passage. Further, since the supercharging gas is of a relatively high temperature, an increase in the amount of the supercharging gas and a corresponding decrease in the amount of the main intake gas cause an overall decrease in the total charge.

In order to solve the above problems, Tomoo Tadokoro and Haruo Okimoto, co-inventors of the present invention have proposed, by a U.S. Patent application filed on Nov. 8, 1979 and assigned Ser. No. 092,289, a rotary piston engine including an auxiliary or supercharging passage which opens to the working chamber through a supercharging port adapted to be closed a certain time after the main intake port has been closed. The supercharging passage further has a timing valve adapted to be opened at the end period of the intake stroke so that the supercharging gas is introduced into the working chamber only at the end period of the intake stroke. It has been found that the proposed engine is effective to prevent the blow back of intake gas to the main intake prot and that a satisfactory supercharge can be effected even with a relatively a small supercharger because the supercharging gas can be accumulated during a period wherein the timing valve is closed.

It should however be noted that in the proposed engine the supercharging gas is supplied only in a limited period so that under a high engine speed the actual time available for supercharging becomes very short whereby an adequate supercharging can no longer be maintained. Stating in more detail, the inertia of the intake gas flow through the main intake passage increases in proportion to an increase in the engine speed and, since the blow back from the supercharging port to the main intake port is largely dependent on the inertia of the intake gas flow, the blow back is more likely to occur under a low speed engine operation. It should therefore be noted that, in an arrangement wherein the supercharging is started at a constant timing irrespective of the engine speed, it would be advisable for suppressing the blow back under a low speed engine operation to decrease the overlap period between the main intake and the supercharging ports. However, this will result in a decrease in the supercharging time period under a high speed so that an adequate supercharging cannot be attained. If the overlap between the main intake and the supercharging ports is increased, it would be possible to accomplish a satisfactory supercharging under a high engine speed by starting the supercharging when the pressure in the intake working chamber is still low in relation to the supercharging pressure. However, this will cause a serious problem in that a blow back will be produced under a low engine speed. Thus, in the proposed engine, the supercharging can effectively be performed only in either of the high or low speed engine operation.

It is therefore an object of the present invention to provide a rotary piston engine including a supercharged intake system which does not have the aforementioned problems.

Another object of the present invention is to provide an intake system for rotary piston engines including supercharging means which can perform a satisfactory supercharging throughout the operating range of the engine without producing blow back to the main intake port means.

Another object of the present invention is to provide a rotary piston engine having a supercharged intake system in which supercharging timing is controlled in accordance with the engine speed.

According to the present invention, in order to accomplish the above and other objects, there is provided a rotary piston engine comprising a casing which includes a rotor housing having an inner wall of trochoidal configuration and a pair of side housings secured to the opposite sides of the rotor housing to define a rotor cavity of trochoidal configuration in the casing, a rotor of polygonal configuration disposed in said rotor cavity for rotation with apex portions in sliding engagement with the inner wall of the rotor housing to define working chambers of which volumes are cyclically changed upon rotation of the rotor, an intake system including main intake port means and supercharging port means formed in said casing so that the supercharging port means is closed later than the main intake port means, means for providing a supply of intake gas to the main intake port means, means for positively supplying supercharging gas to the supercharging port means, timing valve means associated with said supercharging port means and adapted to be opened at an end period of intake stroke, valve timing control means responsive to engine speed for advancing open timing of the timing valve means in response to an increase in the engine speed.

According to the features of the present invention, the supercharging gas supply to the supercharging port means is controlled by the timing valve means of which open timing is advanced in response to an increase in the engine speed. Therefore, it is possible to have the valve timing sufficiently retarded under a low speed engine operation so that blow back to the main intake port means is prevented while ensuring an adequate supercharging period under a high engine speed.

The valve timing control means may conveniently comprise centrifugal means which is driven by output shaft means of the engine. The supercharging gas supply means may be comprised of supercharging passage means communicating with said supercharging port means and provided upstream of the timing valve means with supercharger means. In a preferable aspect of the present invention, the supercharging passage means is provided with control valve means which is adapted to control cross-sectional area of the supercharging passage means in accordance with engine load. Preferably, the control valve means is provided between the supercharger means and the timing valve means. Where the supercharging passage means is provided with relief passage means, the control valve means is located downstream of the relief passage means.

The supercharging port means may preferably be formed in at least one of the side housings in such a position that it is closed before top dead center wherein the working chamber in intake stroke possesses a minimum volume. The timing valve means may be comprised of a rotary valve in the form of a rotary shaft having a diametrical through-hole and adapted to be rotated synchronous to the engine output shaft so that the through-hole is cyclically brought into communication with the supercharging passage means.

The above and other objects and features of the present invention will become apparent from the following descriptions of a preferred embodiment taking reference to the accompanying drawings, in which.

Figure 1:
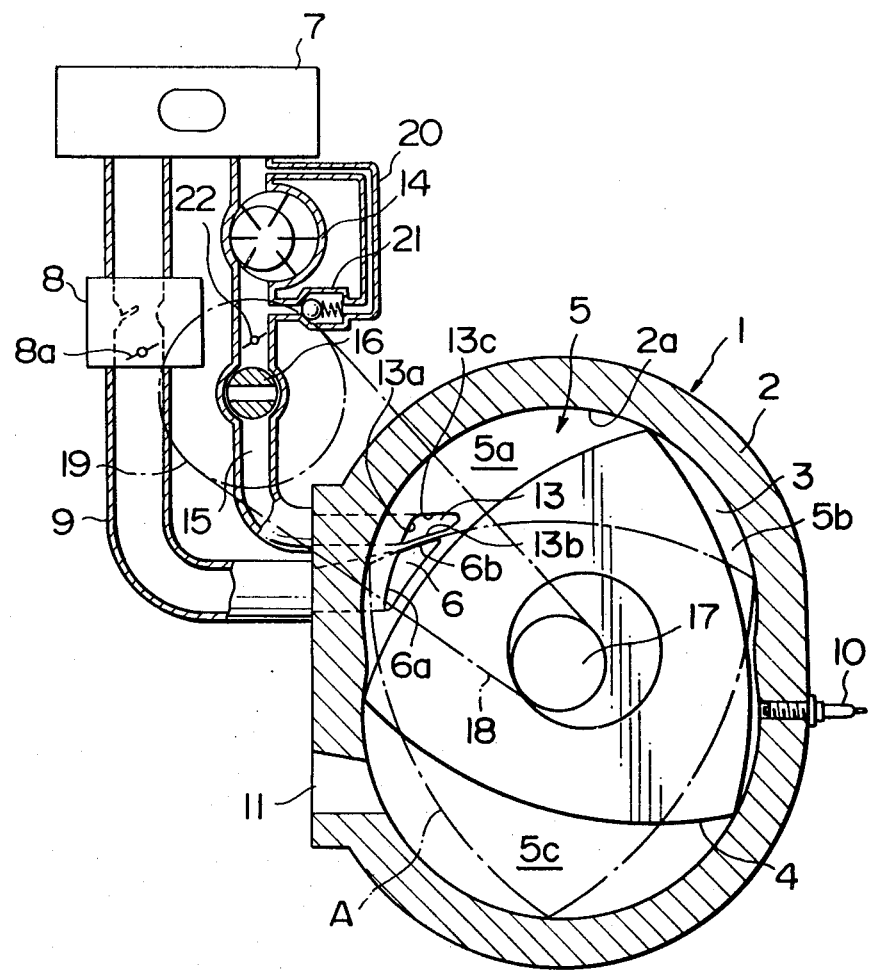
FIG. 1 is a sectional view of a rotary piston engine in accordance with one embodiment of the present invention.

Referring now to the drawings, particularly to FIG. 1, the rotary piston engine shown therein includes a casing 1 comprised of a rotor housing 2 having a trochoidal inner wall 2a and a pair of side housings 3 secured to the opposite sides of the rotor housing 2. In the casing 1, there is disposed a rotor 4 of substantially triangular configuration which is rotatable with apex portions in sliding contact with the inner wall 2a of the rotor housing 2. Thus, there are defined in the casing 1 three working chambers 5a, 5b and 5c by the inner wall 2a of the rotor housing 2 and the flanks of the rotor 4. The volume of each working chamber changes cyclically in response to a rotation of the rotor 4.

One of the side housings 3 is formed with a main intake port 6 which leads from an air cleaner 7 through a carburetor 8 and an intake passage 9. The main intake port 6 is so located that it opens to one of the working chambers during a predetermined period of the rotation of the rotor 4. In the position of the rotor 4 shown by solid lines in FIG. 1, the main intake port 6 is opened to the chamber 5a which is in the intake stroke.

The rotor housing 2 is provided with one or more ignition plugs 10 at the working chamber 5b which is in the compression stroke. Further, the rotor housing 2 is formed with an exhaust port 11 which opens to the exhaust working chamber 5c.

The side housing 3 having the main intake port 6 is further formed with a supercharging air port 13 which is located in respect of the direction of rotor rotation at the leading side of the main intake port 6. The port 13 is so formed that it injects supercharging air to the working chamber 5a in axial direction of the rotor 4. The supercharging air port 13 is connected with a supercharging air passage 15 which leads from the air cleaner 7 and has a vane type air pump 14. The air pump or supercharger 14 is driven by an eccentric shaft 17 carrying the rotor 4 through a power transmitting belt or like power transmitting device.

In the supercharging air passage 15, there is provided a rotary type timing valve 16 which is in the form of a rotary shaft and has a pulley 19 which is adapted to be driven by the eccentric shaft 17 through a timing belt 18 so that the timing valve 16 conducts one complete rotation in every two rotation of the eccentric shaft 17. A relief passage 20 is provided to connect the outlet side of the supercharger 14 with the inlet side thereof and has a ball type relief valve 21 to return the output air from the supercharger 14 to the inlet side when the timing valve 16 is closed. In an alternative arrangement, the relief passage 20 may not be connected with the inlet side of the supercharger 14 but may be opened to atmosphere.

Between the timing valve 16 and the relief passage 20, there is provided a control valve 22 which may be connected through a linkage (not shown) with a throttle valve 8a in the carburetor 8 so that its opening is increased when the throttle valve opening is increased to thereby control the amount of supercharging air in accordance with the engine load. Alternatively, the control valve 22 may be actuated by the intake suction pressure in the main intake passage 9. It is preferable that the control valve 22 be closed under the idling operation of the engine to thereby close the supercharging passage 15 so that the supercharging is interrupted but started to open when the engine throttle valve 8a is opened beyond a predetermined value.

The supercharging air port 13 has a radially outboard edge 13a which determines the port opening timing and is so located that the port 13 is opened substantially simultaneously with the main intake port 6. In other words, the edge 13a of the port 13 is located along an extension of the corresponding outboard edge 6a of the main intake port 6, which is drawn substantially along the flank of the rotor immediately before the beginning of the intake stroke as shown by broken lines A. Since the locations of the edges 6a and 13a must be determined taking into consideration the overlap with the exhaust port 11, the edge 13a should be so located that the port 13 is opened substantially at the same time as the main intake port 6 is opened whereby a satisfactory port area can be provided without increasing the overlap.

The supercharging air port 13 also has a trailing edge 13b which is preferably located close to and substantially parallel with the leading edge 6b of the main intake port 6. With this location of the trailing edge 13b, the port 13 is started to be closed immediately after the main intake port 6 has been completed closed by the rotor 4. The leading edge 13c of the port 13 is substantially parallel with the trailing edge 13b and spaced apart therefrom in such a manner that the port 13 is completely closed when the eccentric shaft 17 is rotated 30° to 70° after the main intake port 6 has been completely closed. It is preferable to determine the location of the leading edge 13c so that the port 13 is closed as late as possible provided that the blow back to the port 13 is not produced. In other words, the position of the leading edge 13c should be determined in such a manner that the supercharging air port 13 is completely closed immediately before the pressure in the working chamber increases to the level of the air pressure supplied to the port 13.

Figure 2:
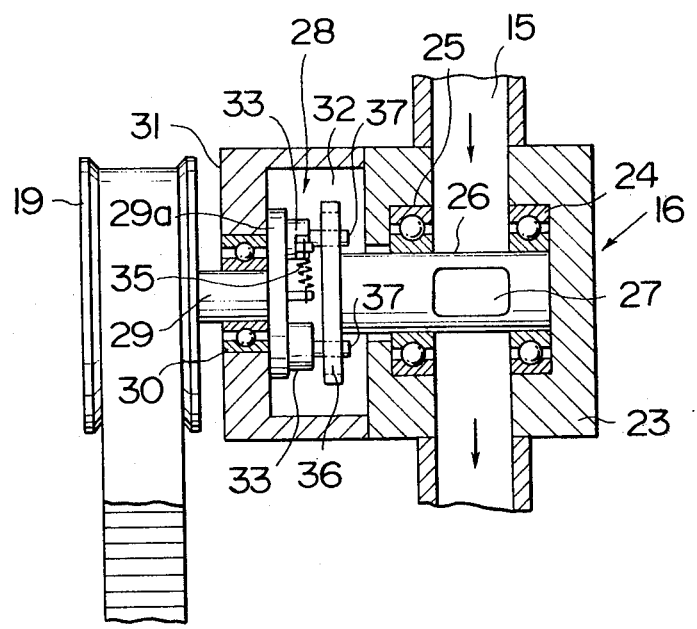
FIG. 2 is a sectional view showing the timing valve adopted in the engine shown in FIG. 1.

Referring to FIG. 2, it will be noted that the timing valve 16 comprises a valve case 23 which forms a part of the supercharging passage 15 and a valve member 26 in the form of a rotary shaft having a radial through-hole 27. The valve member 26 is carried on the valve casing 23 by means of a pair of axially spaced bearings 24 and 25 in such a manner that the through-hole 27 is aligned with the supercharging passage 15 cyclically upon rotation of the valve member 26. One end of the valve member 26 is connected through a centrifugal device 28 with a shaft 29 which carries the aforementioned pulley 19.

Figure 3:
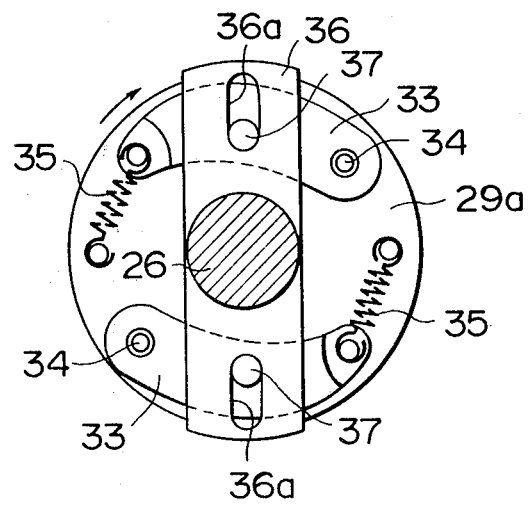
FIG. 3 is a view showing the centrifugal governor device for controlling the timing valve.

The centrifugal device 28 is provided in a casing 31 which carries the pulley shaft 29 through a bearing 30 and defines a chamber 32. As shown in FIG. 3, the shaft 29 has a disc 29a at an end adjacent to the valve member 26 and a pair of centrifugal weights 33 are pivotally mounted at one ends on the disc 29a by means of pins 34. The other ends of the weights 33 are retained by means of springs 35 to the disc 29a so as to be biased radially inwardly. When the disc 29a is rotated, —the centrifugal forces produced in the weights overcome the bias forces of the springs 35 so that the weights 33 are swung radially outwardly about the pins 34.

The valve member 26 is provided at the end adjacent to the shaft 29 with a radially extending drive plate 36 which is formed at the opposite ends thereof with a pair of radially extending slots 36a. The centrifugal weights 33 carry pins 37 which are engaged with the slots 36a respectively. It should therefore be understood that as the disc 29a is rotated in the direction shown by an arrow in FIG. 3, the centrifugal weights 33 are swung radially outwardly about the pins 34 and the amounts of the swinging movements are dependent on the speed of rotation of the disc 29a. Therefore, as the speed of the disc 29a is increased, the weights 33 take radially outwardly shifted positions so that the driving plate 36 is displaced with respect to the disc 29a in the same direction as the rotation of the disc 29a. Thus, the valve timing can be advanced in response to an increase in the rotating speed of the shaft 29.

Figure 4A:
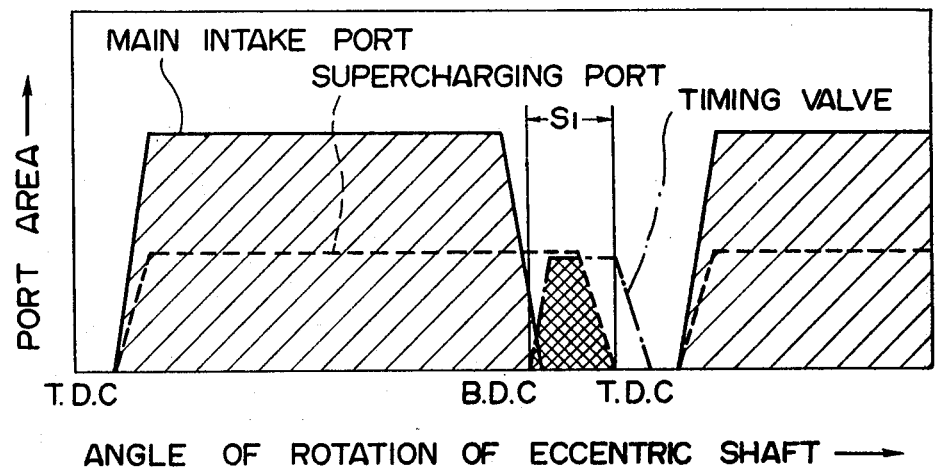
FIG. 4 (a) is a diagram showing the timings of the main intake port and the supercharging port under a low speed engine operation; and, FIG. 4 (b) is a diagram showing the timings under a high speed engine operation.
Figure 4B:
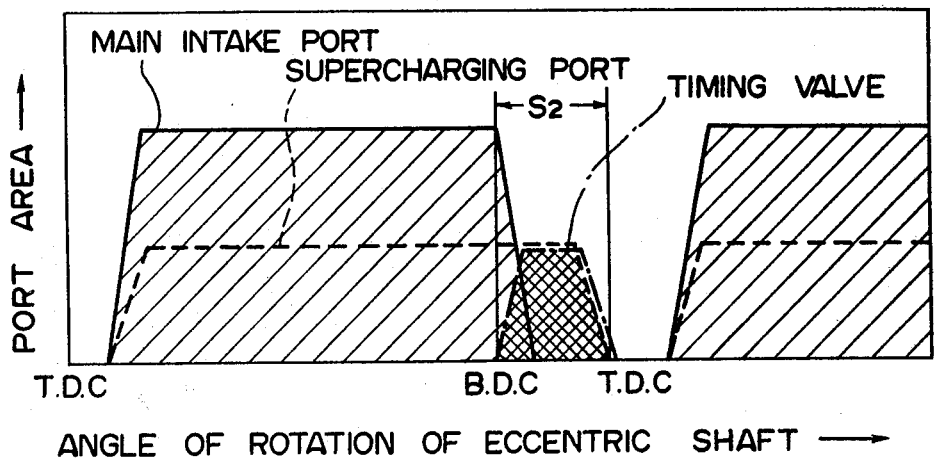

Referring now to FIGS. 4 (a) and (b), it will be noted that the main intake port 6 is opened slightly after the intake top dead center so that air-fuel mixture from the carburetor 8 is introduced into the intake working chamber 5a under a suction pressure prevailing in the chamber 5a. The supercharging port 13 is opened to the chamber 5a substantially simultaneously with the main intake port 6, however, in the initial stage of the intake stroke, the supercharging passage 15 is closed by the timing valve 16 so that the supercharging air is not supplied through the port 13 to the chamber 5a.

The main intake port 6 is closed after the intake bottom dead center, for example 30° to 70° after the intake bottom dead center in terms of the angle of rotation of the eccentric shaft 17. The supercharging port 13 is completely closed a predetermined time after the main port 6 has been closed. It is important in an arrangement wherein the main and supercharging ports 6 and 13 are both formed in the side housing 3 to have the supercharging port 13 completely closed before the main port 6 is opened to the trailing working chamber. For the purpose of increasing the area of the supercharging port 13 as large as possible, it is desirable that the closing timing of the port 13 be as late as possible. However, if the closing of the port 13 is excessively delayed, a high supercharging pressure will be required in order to prevent a blow back to the supercharging port 13. It is therefore preferable that the supercharging port 13 be closed not later than 90° after the intake bottom dead center.

As shown in FIG. 4 (a), the timing valve 16 opens the passage 15 under a low speed engine operation slightly before the main intake port 6 is completely closed and closes the passage 15 predetermined time after the port 13 has been completely closed. Therefore, supercharging air is supplied to the working chamber 5a in a period between a time slightly before the main port 6 is completely closed and a time when the supercharging port 13 is completely closed as shown by $S_1$. The time period $S_1$ of the supercharging is approximately 30° in terms of the angle of rotation of the eccentric shaft 17 under an engine speed of, for example, 1000 rpm.

When a high speed engine operation, the centrifugal device 28 functions to advance the valve opening timing as shown in FIG. 4 (b). For example, the valve opening timing is advanced approximately 10° in terms of the angle of rotation of the eccentric shaft 17 in response to an increase in the engine speed of 1000 rpm. Thus, under high engine speed, the timing valve 16 starts to open the supercharging port 13 before the main intake port 6 starts to close. At this instance, the timing valve 16 closes the passage 15 substantially at the same time as the port 13 is closed. It should therefore be understood that the supercharging period $S_2$ under a high engine speed is substantially increased as compared with the period $S_1$ under a low engine speed. The supercharging period $S_2$ may be appropriately determined so that a required supercharging is performed. For example, the valve timing may be continuously changed between 1000 and 4000 rpm but may be maintained constant under an engine speed exceeding 4000 rpm. Under a high speed engine operation, the intake mixture flow through the main intake port 6 has a sufficiently large inertia so that there is no possibility of blow back even with an advanced timing of the supercharging.

The invention has thus been shown and described with reference to a specific embodiment, however, it should be noted that the invention is in no way limited to the details of the illustrated structures but changes and modifications may be made without departing from the scope of the appended claims.

We claim:

1. Rotary piston engine comprising a casing which includes a rotor housing having an inner wall of trochoidal configuration and a pair of side housings secured to the opposite sides of the rotor housing to define a rotor cavity of trochoidal configuration in the casing, a rotor of polygonal configuration disposed in said rotor cavity for rotation with apex portions in sliding engagement with the inner wall of the rotor housing to define working chambers of which volumes are cyclically changed upon rotation of the rotor, an intake system including main intake port means and supercharging port means formed in said casing so that the supercharging port means is closed later than the main intake port means, means for providing a supply of intake gas to the main intake port means, and means for positively supplying supercharging gas to the supercharging port means, timing valve means associated with said supercharging port means and adapted to be opened at an end period of intake stroke under a low speed engine operation, valve timing control means responsive to engine speed for advancing open timing of the timing valve means in response to an increase in the engine speed.

2. Rotary piston engine in accordance with claim 1 in which said supercharging gas supply means is comprised of supercharging passage means communicating with said supercharging port means and provided upstream of the timing valve means with supercharger means, said supercharging passage means being provided with control valve means which is adapted to control cross-sectional area of the supercharging passage means in accordance with engine load.

3. Rotary piston engine in accordance with claim 2 in which the control valve means is provided between the supercharger means and the timing valve means.

4. Rotary piston engine in accordance with claim 2 in which said supercharging passage means is provided with relief passage means for relieving excessive pressure downstream of the supercharger means, said control valve means being located downstream of the relief passage means.

5. Rotary piston engine in accordance with claim 1 in which said supercharging port means is formed in at least one of the side housings in such a position that it is closed before top dead center wherein the working chamber in intake stroke possesses a minimum volume.

6. Rotary piston engine in accordance with claim 5 in which said main intake port means is formed in at least one of the side housings.

7. Rotary piston engine in accordance with claim 1 in which said timing valve means is comprised of a rotary valve in the form of a rotary shaft having a valve port and adapted to be rotated synchronous to the engine output shaft so that the valve port is cyclically brought into communication with the supercharging passage means.

8. Rotary piston engine in accordance with claim 7 in which the valve timing control means comprises centrifugal means which is driven by output shaft means of the engine.

* * * * *